United States Patent
Vermeersch et al.

(10) Patent No.: US 9,428,211 B2
(45) Date of Patent: Aug. 30, 2016

(54) SYSTEMS FOR DETECTING LOCKED CONDITION OF STEERING COLUMN

(71) Applicant: STEERING SOLUTIONS IP HOLDING CORPORATION, Saginaw, MI (US)

(72) Inventors: Michael C. Vermeersch, Essexville, MI (US); Arthur W. Nellett, Davison, MI (US); Gerald M. McCann, Bay City, MI (US); Shawn A. Haring, Swartz Creek, MI (US); Frederick J. Berg, Auburn, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/552,754

(22) Filed: Nov. 25, 2014

(65) Prior Publication Data

US 2016/0144883 A1    May 26, 2016

(51) Int. Cl.
     *B62D 1/184*      (2006.01)
     *B62D 1/19*      (2006.01)

(52) U.S. Cl.
     CPC .............. *B62D 1/184* (2013.01); *B62D 1/19* (2013.01)

(58) Field of Classification Search
     CPC .................................. B62D 1/184; B62D 1/19
     See application file for complete search history.

(56) References Cited

U.S. PATENT DOCUMENTS

| | | | | |
|---|---|---|---|---|
| 4,747,278 A | * | 5/1988 | Roncelli | F16H 59/10 70/187 |
| 4,750,379 A | * | 6/1988 | Nishikawa | B62D 1/181 280/775 |
| 4,934,737 A | * | 6/1990 | Nakatsuka | B62D 1/183 180/78 |
| 4,981,048 A | * | 1/1991 | Kobayashi | B60K 20/06 180/336 |
| 5,088,766 A | * | 2/1992 | Nakatsuka | B62D 1/184 180/270 |
| 5,117,664 A | * | 6/1992 | Kurozu | B60R 25/02144 70/186 |
| 6,571,587 B2 | * | 6/2003 | Dimig | B60R 25/02153 70/186 |
| 8,910,540 B2 | * | 12/2014 | Bertet | B62D 1/184 74/495 |
| 2005/0263996 A1 | * | 12/2005 | Manwaring | B62D 1/195 280/775 |
| 2006/0021402 A1 | * | 2/2006 | Kai | B60R 25/02121 70/252 |
| 2009/0139285 A1 | * | 6/2009 | Tanioka | B60R 21/05 70/209 |
| 2009/0218800 A1 | * | 9/2009 | Rouleau | B62D 1/187 280/775 |
| 2012/0174695 A1 | | 7/2012 | Bertet et al. | |

FOREIGN PATENT DOCUMENTS

KR      20060104188 A    * 10/2006

\* cited by examiner

*Primary Examiner* — Darlene P Condra
(74) *Attorney, Agent, or Firm* — Cantor Colburn LLP

(57) ABSTRACT

In one exemplary embodiment of the present invention, a steering column assembly is provided. The steering column assembly includes a steering column, a mounting bracket, an actuator rotatably coupled to the mounting bracket, the actuator rotatable between a locked position and an unlocked position, and a detection assembly configured to detect when the actuator is in the unlocked position.

14 Claims, 8 Drawing Sheets

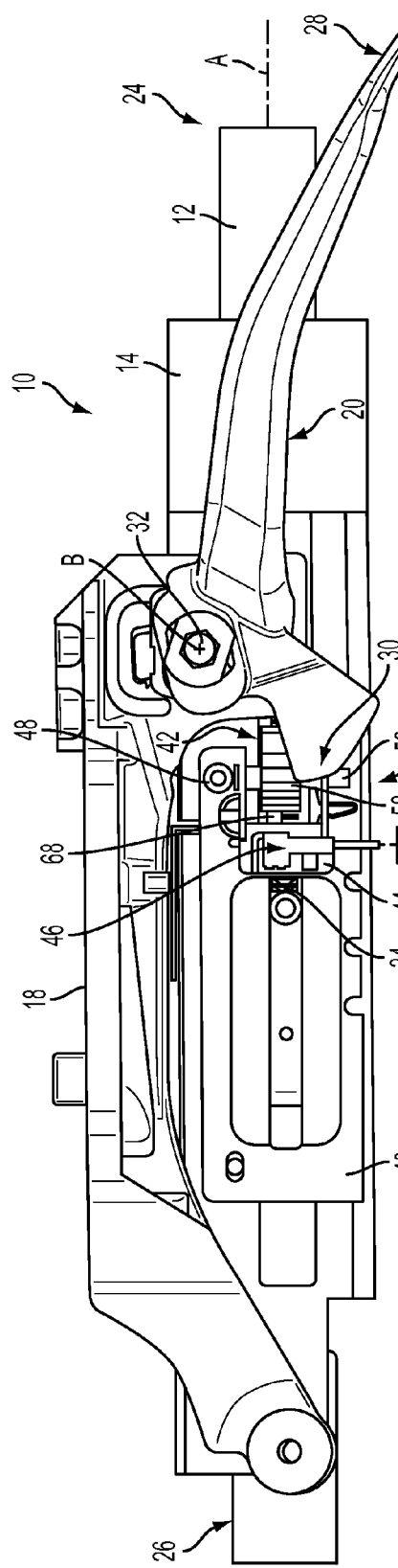
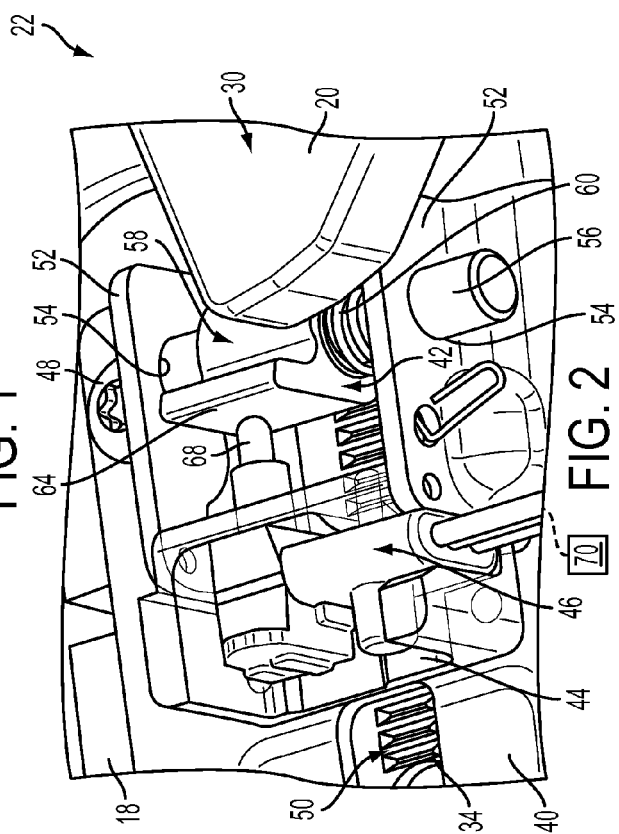
FIG. 1
FIG. 2

SYSTEMS FOR DETECTING LOCKED CONDITION OF STEERING COLUMN

FIELD OF THE INVENTION

The following description relates to a steering column assembly, and in particular, features to detect whether an adjustable steering column assembly is in a locked or unlocked condition.

BACKGROUND

Some steering columns may be adjustable in a rake direction and a telescope direction. A traditional adjustable steering column includes a jacket clamp positioned about a steering column jacket and configured to apply a clamping force to the steering column jacket to prevent adjustment of the steering column in the telescope direction. In addition, a traditional adjustable steering column may include a rake clamp configured to apply a clamping force to the jacket clamp and/or steering column jacket to prevent adjustment of the steering column in the rake direction. The adjustable steering column is in a locked condition when the telescope clamp and the rake clamp respectively apply clamping forces to prevent adjustment of the adjustable steering column in the rake and telescope directions. The adjustable steering column is in an unlocked condition when respective clamping forces from the telescope clamp and the rake clamp are released so that the steering column may be adjusted.

Conventional adjustment assemblies, for example, adjustment assemblies which allow for adjustment of the steering column, include a lever that is rotatable between two positions to lock and unlock the adjustment assembly. For example, with a lever in a first position, the adjustment assembly may lock a steering column in a desired position, thereby fixing the steering column against adjustment. The lever may be rotated to a second position, thereby unlocking the adjustment assembly and allowing the steering column to be adjusted. However, some steering columns are designed for optimal performance when the column adjustment lever or apparatus remains in its locked position. Accordingly, it is desirable to provide a steering column with a feature to detect and warn an operator if the lever is in the unlocked position.

SUMMARY OF THE INVENTION

In one exemplary embodiment of the present invention, a steering column assembly is provided. The steering column assembly includes a steering column, a mounting bracket, an actuator rotatably coupled to the mounting bracket, the lever rotatable between a locked position and an unlocked position, and a detection assembly configured to detect when the lever is in one of the locked or unlocked positions.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a side view of an exemplary steering column assembly of the invention;

FIG. 2 is a perspective view of a portion of the assembly shown in FIG. 1;

DETAILED DESCRIPTION

Figure 3:
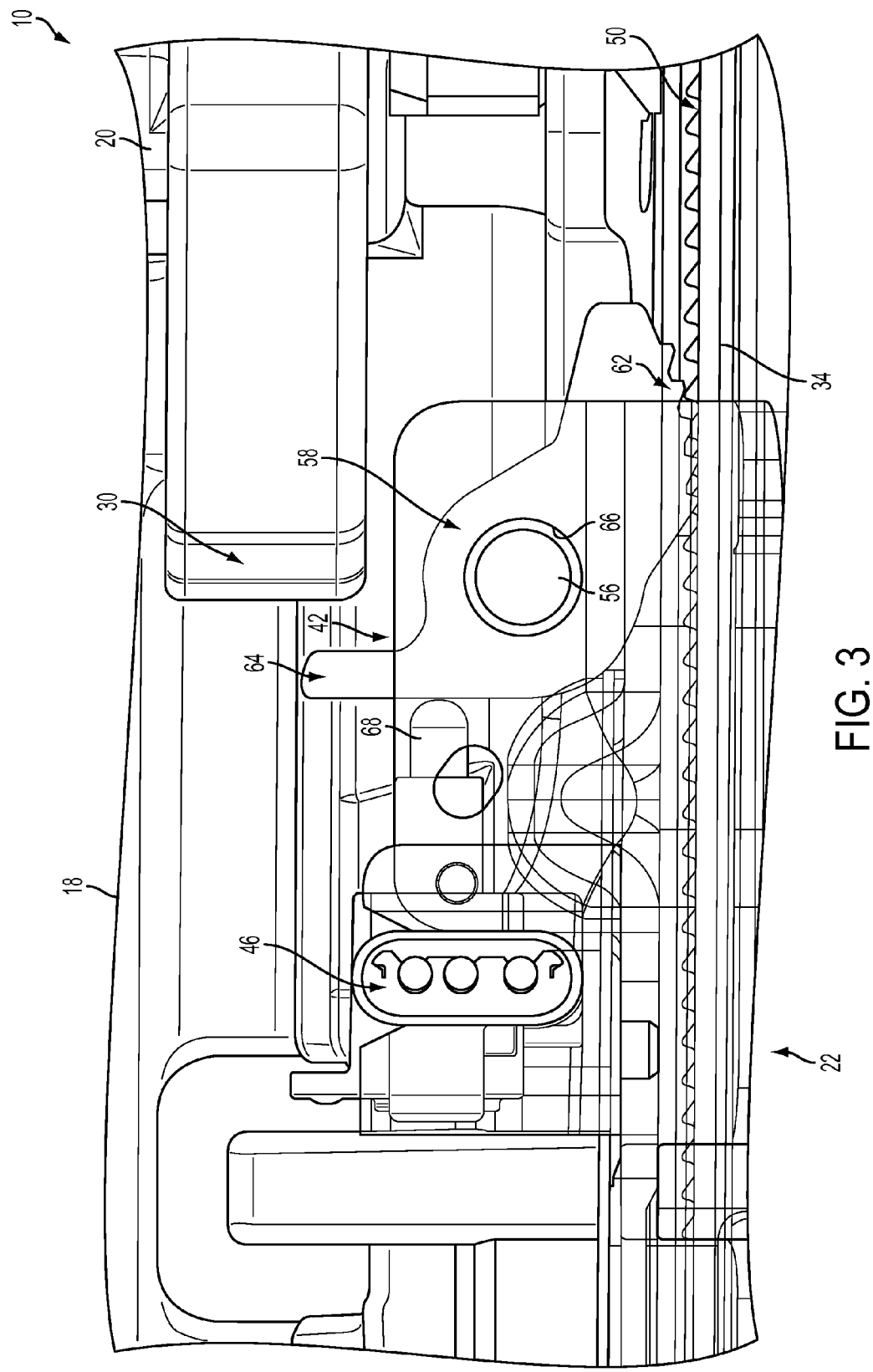
FIG. 3 is a bottom view of the steering column assembly shown in FIG. 1 in a locked position.
Figure 4:
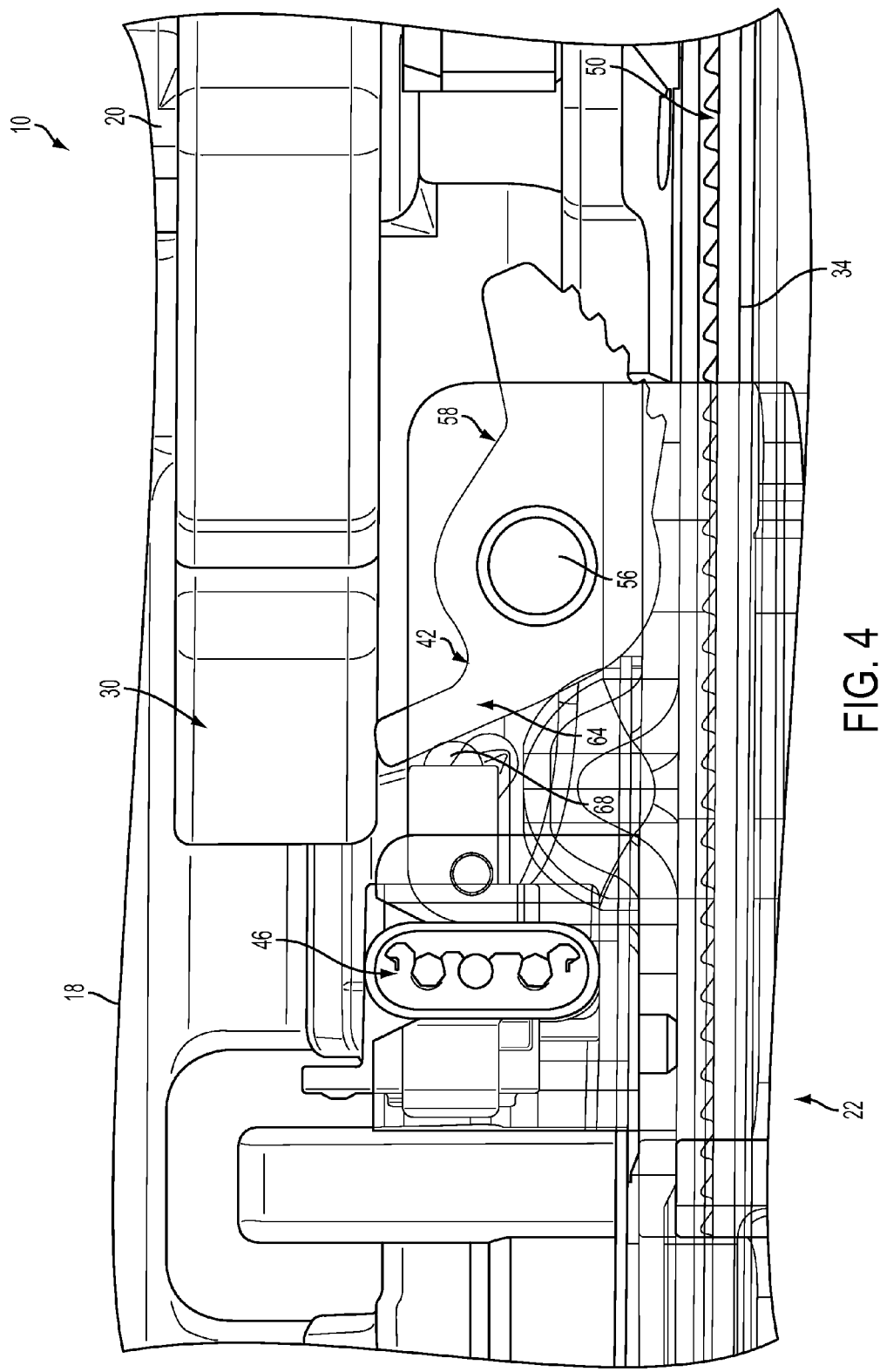
FIG. 4 is a bottom view of the steering column assembly shown in FIG. 1 in an unlocked position.

Referring now to the Figures, where the invention will be described with reference to specific embodiments, without limiting same, FIG. 1 is a side view of an adjustable steering column assembly 10 according to an exemplary embodiment of the present invention. FIGS. 1-3 illustrate a portion of adjustable steering column assembly 10 in a locked position, and FIG. 4 illustrates a portion of adjustable steering column assembly 10 in an unlocked position. With reference to FIG. 1, adjustable steering column assembly 10 generally includes a steering shaft 12, an upper jacket 14 positioned about shaft 12, a mounting bracket 18, an actuator or actuating lever 20, and a lever position detection assembly 22. In an exemplary embodiment, adjustable steering column assembly 10 is adjustable in a rake direction and a telescope direction.

Steering shaft 12 extends along an axis 'A', and a steering wheel (not shown) is attached to an end 24 of shaft 12 while the other end 26 of shaft 12 is coupled to a steering gear (not shown). Upper jacket 14 surrounds and supports shaft 12 via bearings (not shown) disposed between shaft 12 and upper jacket 14. In an exemplary embodiment, upper jacket 14 extends coaxially with steering shaft 12, which is rotatably connected to upper jacket 14.

Mounting bracket 18 is coupled to the vehicle and is configured to selectively apply or release a clamping force to upper jacket 14. Steering shaft 12 is axially retained within upper jacket 14, and with the clamping force applied to upper jacket 14, steering shaft 12 and upper jacket 14 are secured against adjustment in the telescope and/or rake direction. With the clamping force released from upper jacket 14, shaft 12 and upper jacket 14 may be adjusted in the telescope and/or rake direction.

Actuating lever 20 includes a handle portion 28 (FIG. 1) and an engagement portion 30, and is rotatable about an axis B' (FIG. 1). A rake bolt 32 extends along axis 'B' and is coupled to actuating lever 20 to rotate therewith. Actuating lever 20 is rotatable between a locked position (FIGS. 1-3) to initiate the clamping force to upper jacket 14 and an unlocked position (FIG. 4) to release the clamping force to upper jacket 14. When in the locked position, shaft 12 is secured against telescoping/raking adjustment. However, during an impact event (e.g., a crash event), assembly 10 facilitates collapse and movement of upper jacket 14, which is operatively associated with an energy absorption device, such as a roll strap 34, to absorb energy during the deformation of the strap 34 in a crash event.

As shown in FIGS. 1 and 2, lever position detection assembly 22 generally includes a structural bracket 40, a cam assembly 42, a support bracket 44, and a detection sensor or switch 46.

Structural bracket 40 is coupled to mounting bracket 18, for example by a fastener 48 (e.g., a bolt) and is positioned over energy absorbing strap 34, which includes a plurality of teeth 50 formed therein. Structural bracket 40 includes a pair of flanges 52 each having a pin aperture 54 formed therein.

Cam assembly 42 includes a pivot pin 56, a pawl or cam 58, and a biasing mechanism 60 (e.g., a spring). Cam 58 includes locking teeth portion 62, an engagement flange or portion 64, and an aperture 66. Locking teeth 62 are configured to meshingly engage teeth 50 of roll strap 34, and aperture 66 receives pivot pin 56 therein. Pivot pin 56 extends through pin apertures 54 such that cam 58 is rotatably coupled to structural bracket 40 and is movable between a locked first position (FIGS. 1-3) and an unlocked second position (FIG. 4). Biasing mechanism 60 may bias cam 58 in the locked first position to facilitate engagement between locking teeth 62 and roll strap teeth 50.

Support bracket 44 is coupled to structural bracket 40 and supports detection switch 46. In the exemplary embodiment, detection switch 46 includes a switch or plunger 68 operatively associated with cam engagement portion 64. Detection switch 46 is movable between an extended first position (FIGS. 1-3) and a depressed second position (FIG. 4), and detection switch 46 is in signal communication with a controller such as a vehicle controller 70. In one embodiment, plunger 68 may bias cam 58 in the locked first position.

In operation, when lever 20 is in the locked position (FIGS. 1-3), cam 58 is oriented in the locked first position such that locking teeth 62 meshingly engage roll strap teeth 50 (see FIG. 3). As such, in the locked position, roll strap 34, which is coupled to upper jacket 14 at one end and engaged by cam 58 at the other end, absorbs the energy of upper jacket 14 collapsing during an impact event. At this point, plunger 68 is in the extended first position, and detection switch 46 indicates to controller 70 that lever 20 is in the locked position and steering column assembly 10 is prevented from movement in the telescope/rake directions.

When lever 20 is moved to the unlocked position (FIG. 4), lever engagement portion 30 engages cam engagement flange 64, which causes rotation of cam 58. Cam locking teeth 62 are subsequently rotated out of engagement with roll strap 34, which facilitates telescope/rake movement of steering column assembly 10. Further, as cam 58 is rotated, engagement flange is rotated toward plunger 68 and depresses plunger 68 into the second position (FIG. 4). Detection switch 46 thus indicates to controller 70 that lever 20 is in the unlocked position and steering column assembly 10 may move in the telescope and/or rake directions. Controller 70 may subsequently alert a vehicle operator that lever 20 is not in the locked position and should be reset and locked. For example, controller 70 may cause a warning light, digital display, or audible sound to be triggered when plunger 68 is in the depressed position. Additionally, controller 70 may generate a serial communication message.

Figure 5:
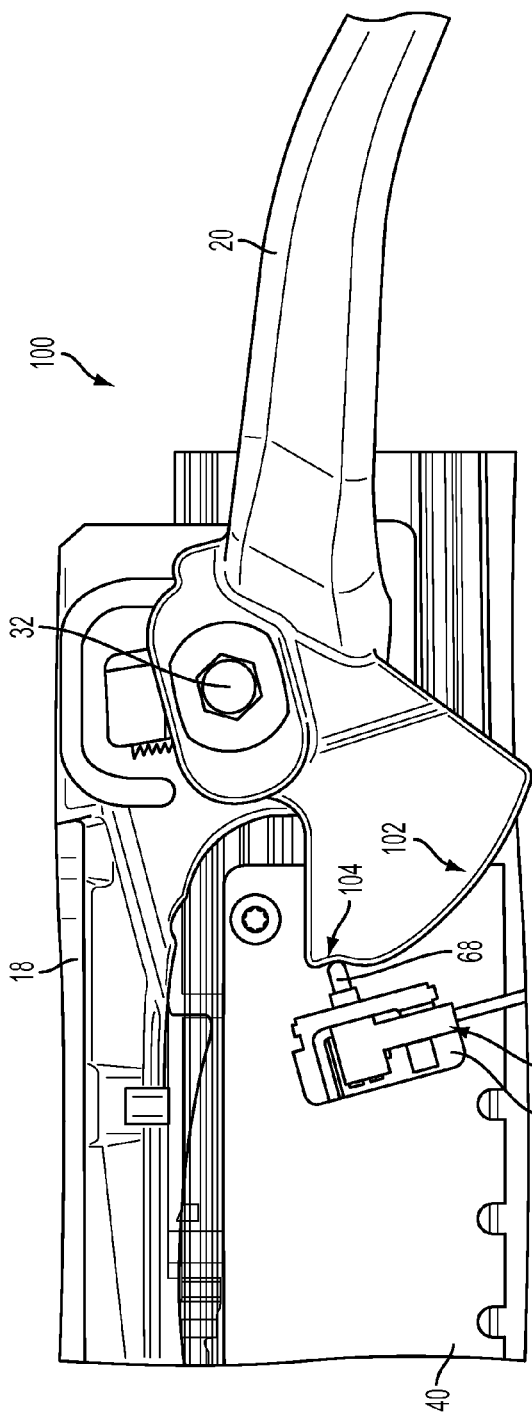
FIG. 5 is a side view of another exemplary steering column assembly in a locked position.
Figure 6:
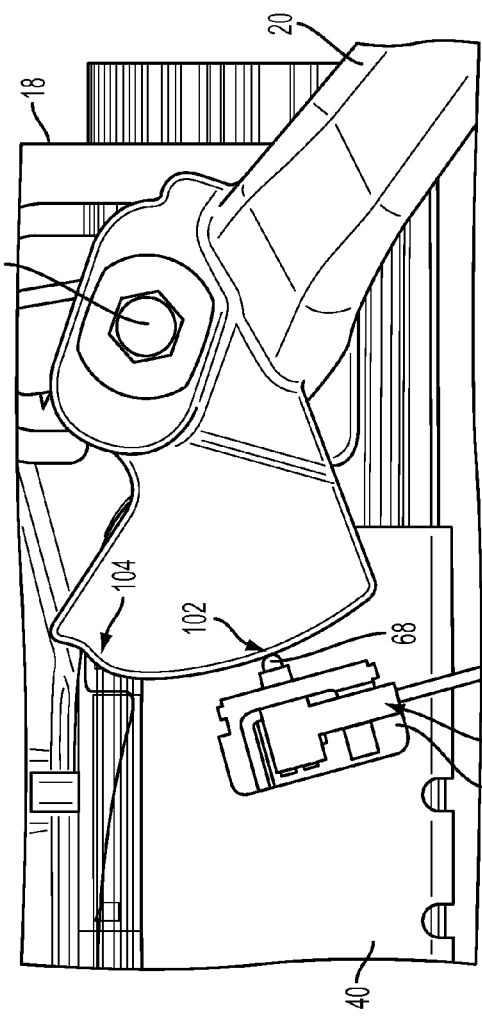
FIG. 6 is a side view of the assembly shown in FIG. 5 in an unlocked position.

FIGS. 5 and 6 illustrate a steering column assembly 100 that is similar to steering column assembly 10 except lever 20 directly engages plunger 68 rather than through intermediary cam assembly 42. In the exemplary embodiment, lever 20 includes an engagement portion 102 and a detent portion 104.

In operation, when lever 20 is in the locked position (FIG. 5), plunger 68 is positioned within detent portion 104 in the extended first position. As such, detection switch 46 indicates to controller 70 that lever 20 is in the locked position and steering column assembly 100 is prevented from movement in the telescope/rake directions.

As shown in FIG. 6, when lever 20 is moved to the unlocked position, engagement portion 102 engages plunger 68 and moves plunger 68 into the depressed second position. Detection switch 46 thus indicates to controller 70 that lever 20 is in the unlocked position and steering column assembly 10 may move in the telescope and/or rake directions. Controller 70 may subsequently alert a vehicle operator that lever 20 is not in the locked position and should be reset and locked.

Figure 7:
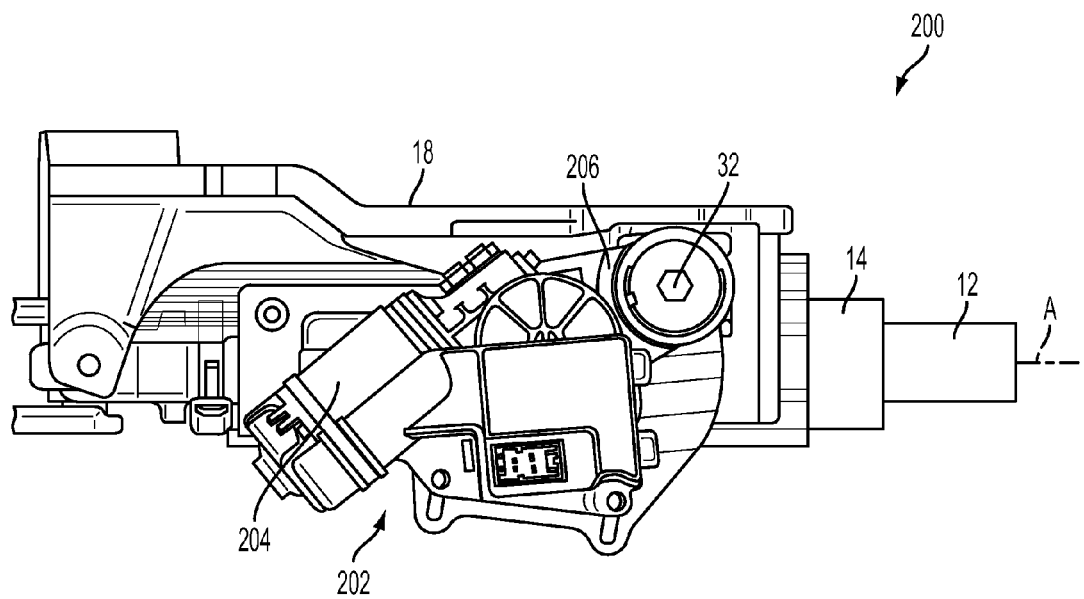
FIG. 7 is a side view of another exemplary steering column assembly in a locked position.
Figure 8:
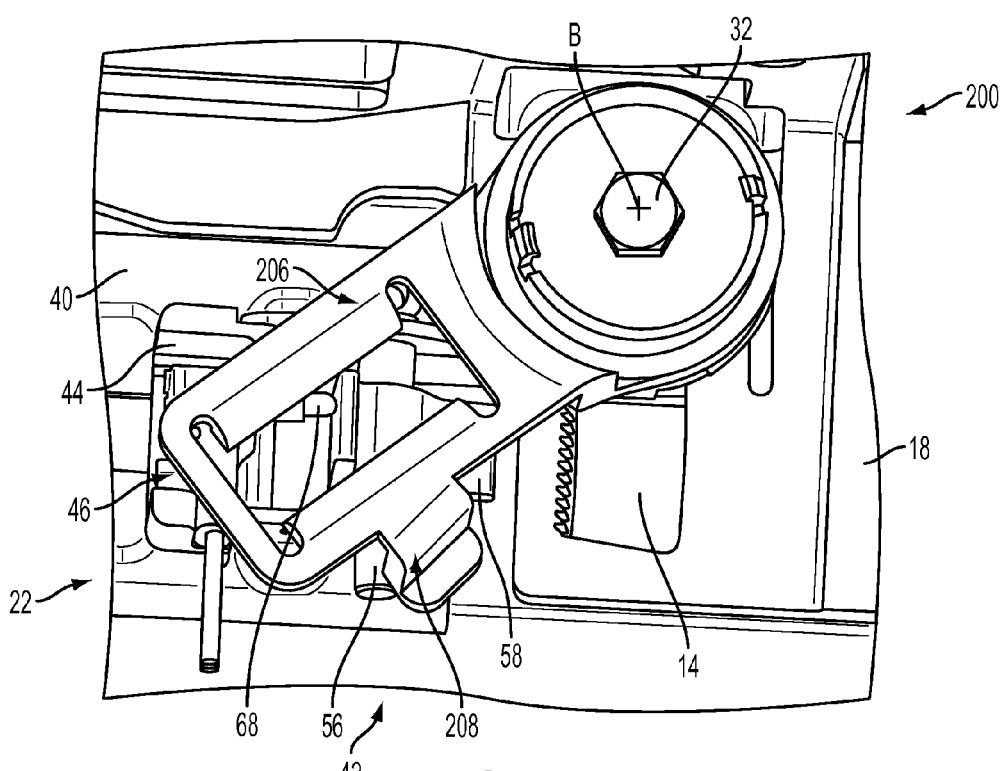
FIG. 8 is a perspective view of a portion of the assembly shown in FIG. 7.
Figure 9:
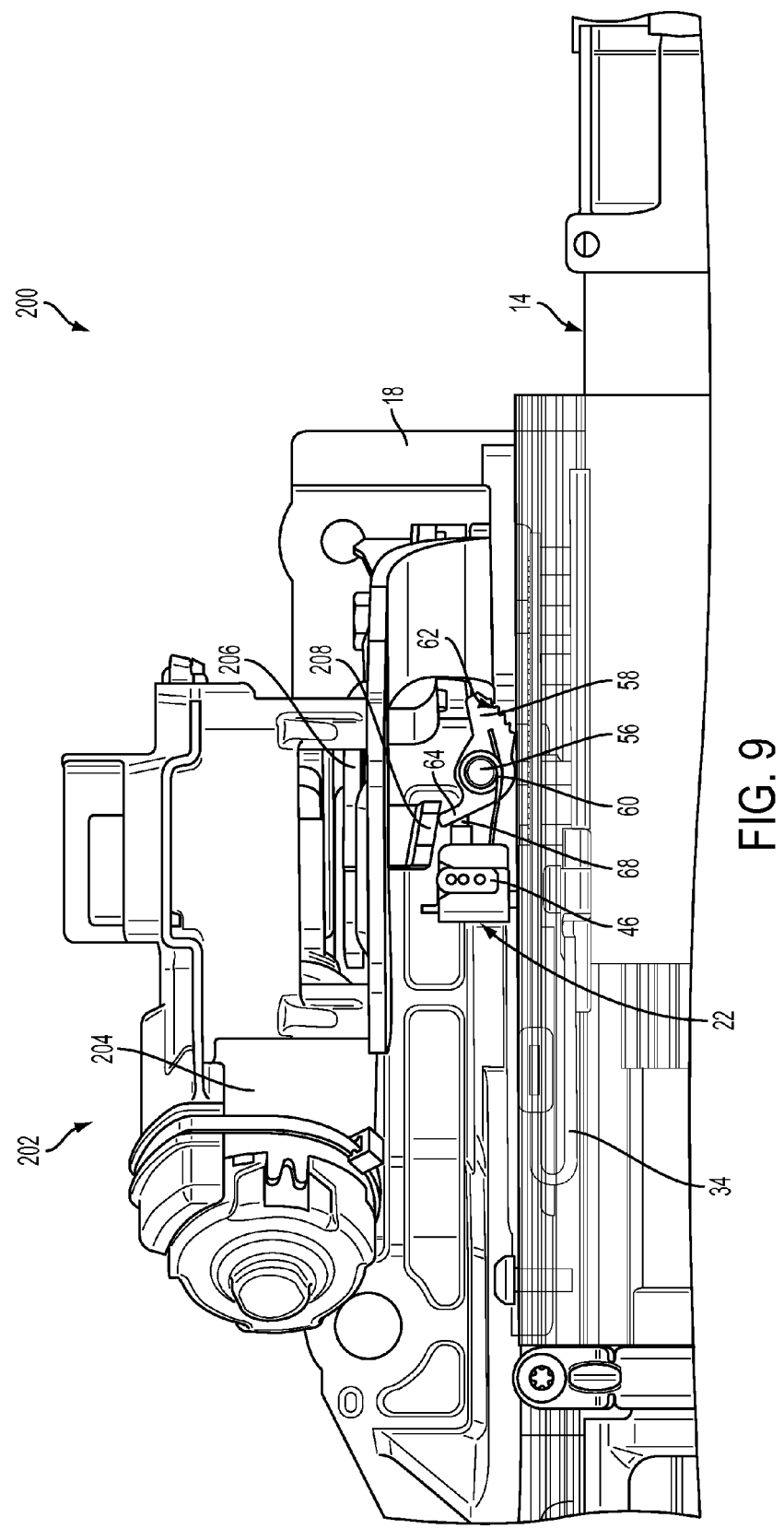
FIG. 9 is a bottom view of the steering column assembly shown in FIG. 8 in an unlocked position.

FIGS. 7-9 illustrate a steering column assembly 200 that is similar to steering column assembly 10 except steering column assembly 200 is an electrically released column. As such, assembly 200 is electrically controlled through a motor assembly 202 rather than mechanically controlled by an operator manually adjusting lever 20. In the exemplary embodiment, steering column assembly 200 includes a motor assembly 202 having a motor 204 operatively associated with a lever or locking arm 206. When motor 204 is actuated, motor assembly 202 rotates locking arm 206 about rake bolt 32 and axis 'B' between the locked position (FIG. 8) and the unlocked position (FIG. 9). Locking arm 206 includes an engagement portion or arm 208 to engage cam engagement flange 64.

In operation, when locking arm 206 is in the locked position (FIG. 8), cam 58 is oriented in the locked first position such that locking teeth 62 meshingly engage roll strap teeth 50. As such, in the locked position, roll strap 34, which is coupled to upper jacket 14 at one end and engaged by cam 58 at the other end, absorbs the energy of upper jacket 14 collapsing during an impact event. At this point, plunger 68 is in the extended first position, and detection switch 46 indicates to controller 70 that lever 206 is in the locked position and steering column assembly 200 is prevented from movement in the telescope/rake directions.

When motor assembly 202 moves locking arm 206 to the unlocked position (FIG. 9), engagement arm 208 engages cam engagement flange 64, which causes rotation of cam 58. Cam locking teeth 62 are subsequently rotated out of engagement with roll strap 34, which facilitates telescope/rake movement of steering column assembly 10. Further, as cam 58 is rotated, engagement flange is rotated toward plunger 68 and depresses plunger 68 into the second position. Detection switch 46 thus indicates to controller 70 that lever 206 is in the unlocked position and steering column assembly 200 may move in the telescope and/or rake directions. Controller 70 may subsequently alert a vehicle operator that lever 206 is not in the locked position and should be reset and locked. Further, controller 70 may take remedial action such as returning locking arm 206 to the locked position to lock steering column assembly 200.

Figure 10:
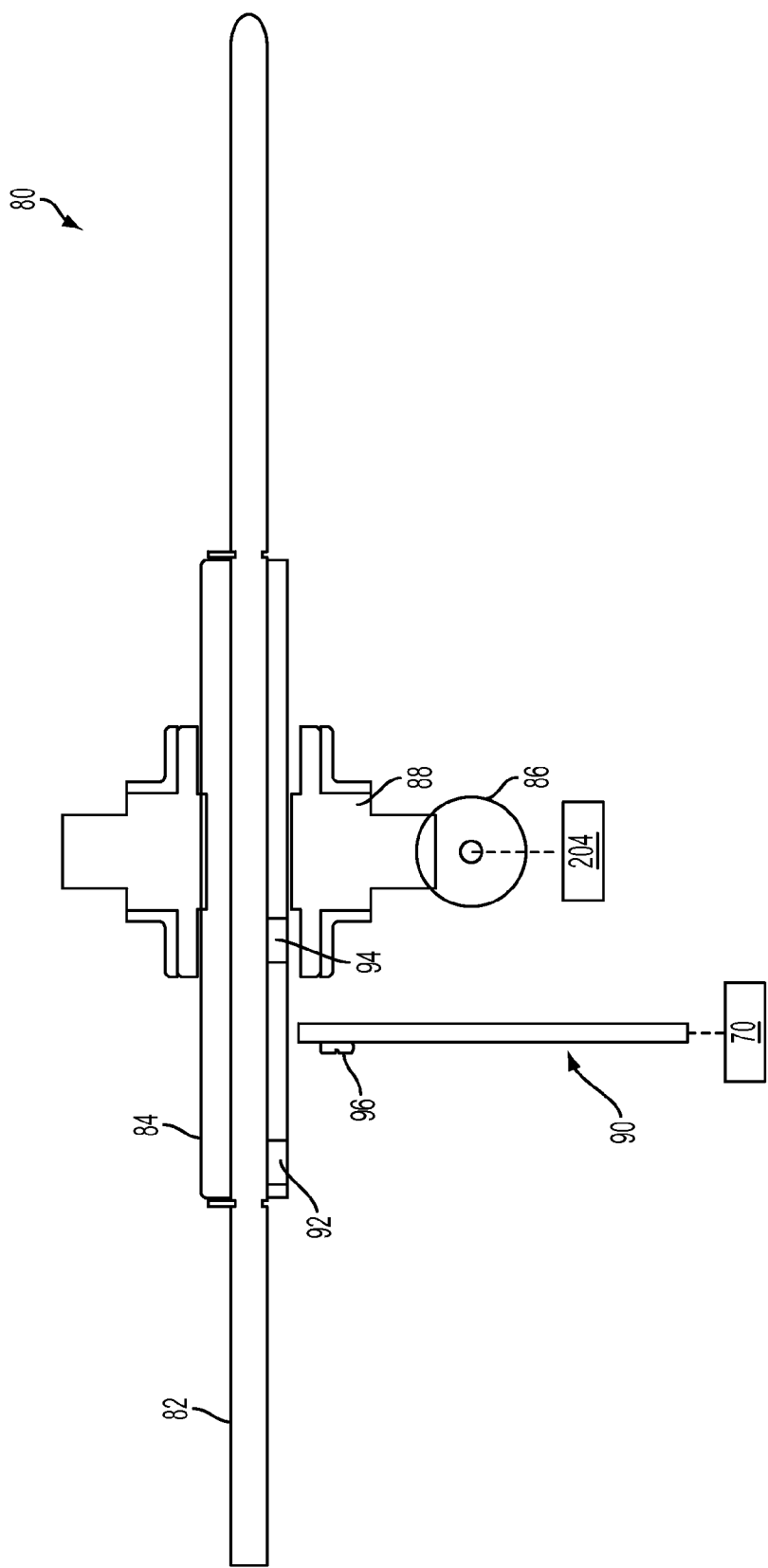
FIG. 10 is a schematic view of a portion of another exemplary steering column assembly.

FIG. 10 illustrates a detection assembly 80 that may be used with steering column assembly 200 instead of cam assembly 42. Detection assembly 80 includes a linear rod 82, an outer rod 84, worm gears 86 and 88, and position detection sensor 90. Outer rod 84 includes a first permanent magnet 92 and a second permanent magnet 94, and detection sensor 90 includes a sensor module 96 (e.g., a hall effect sensor) that senses a magnetic field produced by magnets 92, 94. Motor assembly 202 is operably coupled to worm gear 86, which is operably coupled to outer rod 84 via worm gear 88.

In operation, when locking arm 206 is in the locked position, linear rod 82 is positioned such that magnet 92 is oriented proximate sensor module 96 (e.g., close enough to sense the magnetic field of magnet 92). At this point, position detection sensor 90 indicates to controller 70 that locking arm 206 is in the locked position and steering column assembly 200 is prevented from movement in the telescope/rake directions.

To move locking arm 206 to the unlocked position, motor assembly 202 drives outer worm gear 86, which drives worm gear 88. Outer rod 84 includes a threaded outer diameter engaged with worm gear 88, and outer rod 84 and linear rod 82 linearly translate along an axis 'C' when worm gear 88 is rotated. Linear rod 82 is coupled to locking arm 206, which is moved to the unlocked position by translation of linear rod 82. At this point, magnet 94 is oriented proximate sensor module 96 (e.g., close enough to sense the magnetic field of magnet 94), and position detection sensor 90 indicates to controller 70 that locking arm 206 is in the unlocked position and steering column assembly 200 may move in the telescope and/or rake directions. Controller 70 may subsequently alert a vehicle operator that lever 206 is not in the locked position and should be reset and locked. Further, controller 70 may take remedial action such as returning locking arm 206 to the locked position to lock steering column assembly 200. As such, detection assembly 80 provides absolute positioning by using a physical magnet to sense the actual position of lever 206 (via rod 82), rather than using a software algorithm to estimate where the lever is.

Figure 11:
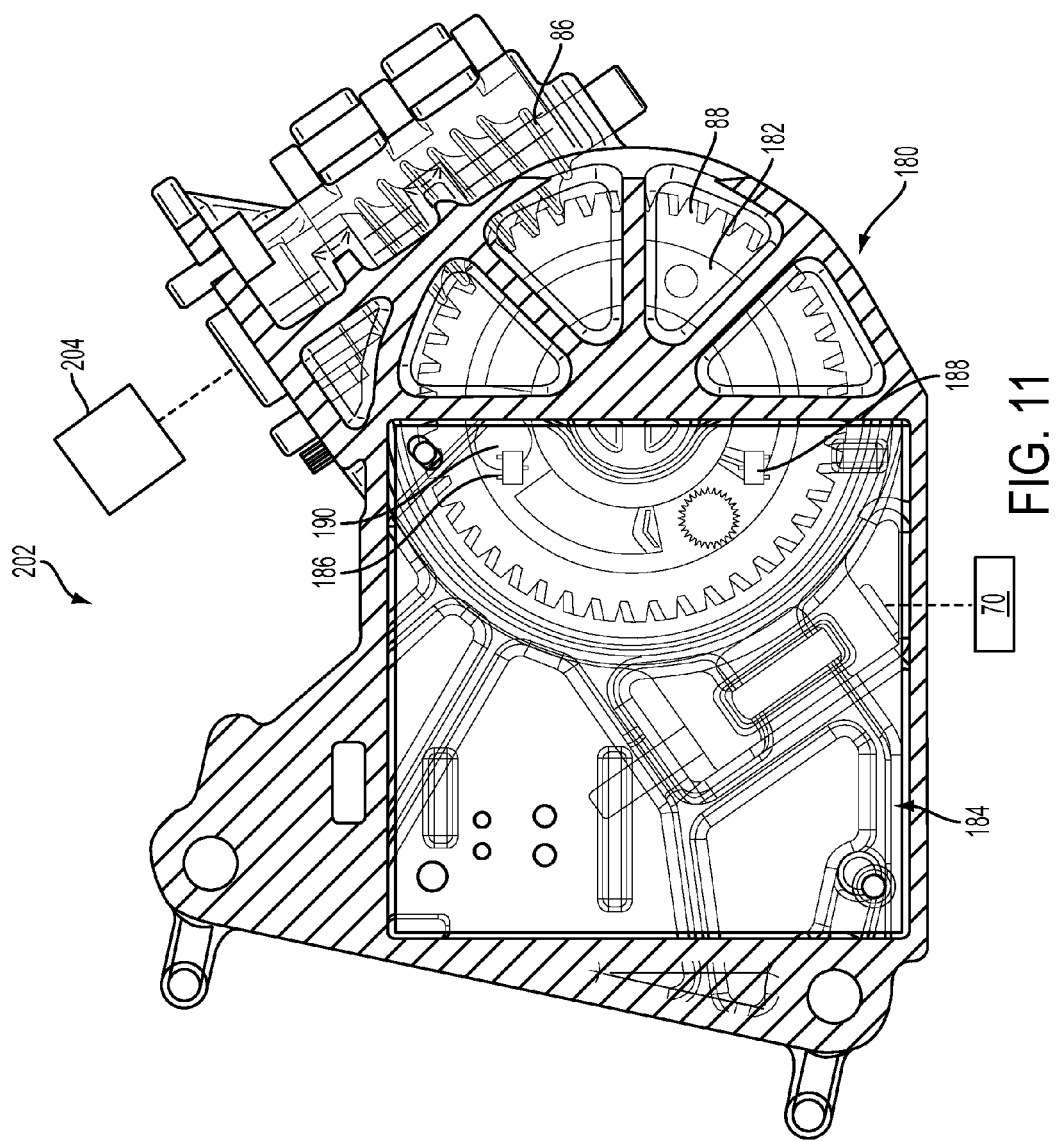
FIG. 11 is a side view of a portion of another exemplary steering column assembly.

FIG. 11 illustrates a detection assembly 180 that may be used with steering column assembly 200 instead of detection assembly 22 and cam assembly 42. Detection assembly 180 includes motor assembly 202, which is configured to move locking arm 206 between the locked and unlocked positions (e.g., a pin pressed into gear hub 182 rides in a slot in lever 206). Motor assembly 202 includes motor 204, worm gears 86, 88, a gear hub 182, and a position detection sensor 184 (e.g., a circuit card). A first sensor module 186 and a second sensor module 188 (e.g., hall effect sensors) are coupled to circuit card 184, and a permanent magnet 190 is coupled to gear hub 182.

In operation, when locking arm 206 is in the locked position, magnet 190 is positioned proximate first sensor module 186 (e.g., close enough to sense a magnetic field of magnet 190). At this point, first sensor module 186 indicates to controller 70 (e.g., via circuit card 184) that locking arm 206 is in the locked position and steering column assembly 200 is prevented from moving in the telescope/rake directions.

To move locking arm 206 to the unlocked position, motor assembly 102 drives worm gear 86, which drives worm gear 88 and rotates gear hub 182. As gear hub 182 rotates, magnet 190 is moved to a position proximate second sensor module 188 (e.g., close enough to sense a magnetic field of magnet 190). At this point, second sensor module 188 senses magnet 190 and indicates to controller 70 that locking arms 206 is in the unlocked position and steering column assembly 200 may move in the telescope and/or rake directions. Controller 70 may subsequently alert a vehicle operator that lever 206 is not in the locked position and should be reset and locked. Further, controller 70 may take remedial action such as returning locking arm 206 to the locked position to lock steering column assembly 200.

Described herein are systems and methods for providing a positive lock detection switch that senses for proper lever position. The switch detects if the lever is locked and, in some embodiments, if the positive locking teeth are engaged. If the lever is not in the proper position, a warning is triggered to alert the operator to reset and lock the lever. In some embodiments, the steering column assembly may be automatically reset and locked.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
    a steering column;
    a mounting bracket;
    an actuator rotatably coupled to the mounting bracket, the actuator configured to adjust the steering column between a locked position and an unlocked position;
    a detection assembly configured to detect when the actuator is in the unlocked position, the detection assembly comprises a detection switch having a plunger movable between a first position and a second position;
    a cam assembly having a cam rotatably coupled to the mounting bracket and movable between a first position and a second position, wherein when the actuator is moved to the unlocked position, the actuator engages the cam and rotates the cam from the first position to the second position such that the cam engages the plunger and moves the plunger from the first position to the second position; and
    an energy absorbing roll strap having teeth formed therein, the cam further comprising a plurality of locking teeth configured to meshingly engage the roll strap teeth when the cam is in the first position and to disengage the roll strap teeth when the cam is rotated to the second position.

2. The assembly of claim 1, further comprising a controller in signal communication with the detection assembly, the detection assembly configured to indicate to the controller when the actuator is in the unlocked position.

3. The assembly of claim 2, wherein the controller is configured to generate at least one of a warning light, a digital display, and an audible sound when the actuator is in the unlocked position.

4. The assembly of claim 3, wherein the actuator comprises an engagement portion and a detent portion, the engagement portion engaging the plunger when the actuator is in the unlocked position such that the plunger is moved from the first position to the second position.

5. The assembly of claim 1, further comprising a motor assembly having a motor configured to rotate the actuator between the locked position and the unlocked position.

6. A steering column assembly, comprising:
    a steering column;
    a mounting bracket;

an actuator rotatably coupled to the mounting bracket, the actuator configured to adjust the steering column between a locked position and an unlocked position; and a detection assembly configured to detect when the actuator is in the unlocked position; and a motor assembly comprising:
  a rod assembly having a first permanent magnet and a second permanent magnet; and
  a motor coupled to the actuator and the rod assembly, the motor configured to linearly translate the rod assembly between a first position and a second position, and to rotate the actuator between the locked position and the unlocked position;
wherein the detection assembly includes a sensor module configured to sense a magnetic field of the first and second permanent magnets.

7. The assembly of claim 6, wherein the first permanent magnet is positioned proximate the sensor module when the rod assembly is in the first position and the actuator is in the locked position, and the second permanent magnet is positioned proximate the sensor module when the rod assembly is in the second position and the actuator is in the unlocked position.

8. The assembly of claim 7, wherein the sensor module is a hall effect sensor.

9. The assembly of claim 6, wherein the motor assembly further comprises a first worm gear and a second worm gear, the first worm gear rotatably coupled between the motor and the second worm gear, the second worm gear rotatably coupled between the first worm gear and the rod assembly.

10. The assembly of claim 6, wherein the rod assembly is coupled to the actuator to move the actuator between the locked position and the unlocked position when the rod assembly is translated between the first position and the second position.

11. A steering column assembly, comprising:
a steering column;
a mounting bracket;
an actuator rotatably coupled to the mounting bracket, the actuator configured to adjust the steering column between a locked position and an unlocked position; and a detection assembly configured to detect when the actuator is in the unlocked position; and a motor assembly comprising:
  a gear having a permanent magnet coupled thereto;
  a motor operably associated with the gear, the motor configured to rotate the gear between a first position and a second position, and to rotate the actuator between the locked position and the unlocked position;
wherein the detection assembly includes a first sensor module and a second sensor module, the first and second sensor modules configured to sense a magnetic field of the permanent magnet.

12. The assembly of claim 11, wherein the permanent magnet is positioned proximate the first sensor module when the gear is in the first position and the actuator is in the locked position, and the permanent magnet is positioned proximate the second sensor module when the gear is in the second position and the actuator is in the unlocked position.

13. The assembly of claim 12, wherein the first and second sensor modules are hall effect sensors.

14. The assembly of claim 11, wherein the detection assembly is coupled to the mounting bracket.

* * * * *